United States Patent
Rothman et al.

(10) Patent No.: US 8,082,431 B2
(45) Date of Patent: Dec. 20, 2011

(54) SYSTEM AND METHOD FOR INCREASING PLATFORM BOOT EFFICIENCY

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 428 days.

(21) Appl. No.: 11/541,242

(22) Filed: Sep. 29, 2006

(65) Prior Publication Data

US 2008/0082808 A1  Apr. 3, 2008

(51) Int. Cl.
*G06F 9/24* (2006.01)
(52) U.S. Cl. .......................................................... 713/1
(58) Field of Classification Search .................... 713/1
See application file for complete search history.

(56) References Cited

U.S. PATENT DOCUMENTS

| | | | |
|---|---|---|---|
| 6,965,989 B1 * | 11/2005 | Strange et al. | 713/1 |
| 7,376,949 B2 * | 5/2008 | Lowell et al. | 718/1 |
| 7,487,330 B2 * | 2/2009 | Altman et al. | 712/43 |
| 7,496,961 B2 * | 2/2009 | Zimmer et al. | 726/23 |
| 2003/0142561 A1 | 7/2003 | Mason et al. | |
| 2005/0071617 A1 | 3/2005 | Zimmer et al. | |
| 2005/0076324 A1 | 4/2005 | Lowell et al. | |
| 2005/0144434 A1 * | 6/2005 | Taylor et al. | 713/2 |
| 2005/0283598 A1 | 12/2005 | Gaskins et al. | |
| 2006/0136664 A1 * | 6/2006 | Trika | 711/113 |
| 2006/0143432 A1 | 6/2006 | Rothman et al. | |

FOREIGN PATENT DOCUMENTS

JP  10-293682 A  11/1998

OTHER PUBLICATIONS

Office Action received for Chinese Patent Application No. 200710192949.6, mailed on May 28, 2010, 6 pages of Office Action and English translation of 11 pages.
Office Action received for Korean Patent Application No. 10-2007-0098869, mailed on Apr. 21, 2010, 3 pages of Office Action and English translation of 3 pages.
Office Action received for European Patent Application No. 07253877.0, mailed on Aug. 5, 2009, 6 pages.
Barham, et al., "Xen and the art of virtualization", Proceedings of the nineteenth ACM symposium on Operating systems principles, Oct. 19-22, 2003, 14 Pages.
Pratt, et al., "Xen 3.0 and the Art of Virtualization", Proceedings of the Linux Symposium, vol. 2, Jul. 20-23, 2005, pp. 65-80.
Office Action received for Chinese Patent Application No. 200710192949.6, mailed on Mar. 27, 2009, 6 pages of Office Action and English translation of 11 pages.

(Continued)

*Primary Examiner* — Thomas Lee
*Assistant Examiner* — Eric Chang
(74) *Attorney, Agent, or Firm* — Grossman, Tucker, Perreault & Pfleger, PLLC

(57) ABSTRACT

Embodiments of the invention involve decreasing boot time by utilizing virtualization or partitioning techniques. In an embodiment, a hypervisor/platform partition controls the platform access to the boot target medium. Boot target data is selectively stored in a fast memory. When the system reboots, or an operating system on the platform is reset, boot target information may be retrieved from the fast memory rather than the original, slower boot target medium. Other embodiments are described and claimed.

27 Claims, 3 Drawing Sheets

OTHER PUBLICATIONS

Office Action received for Korean Patent Application No. 10-2007-0098869, mailed on Jun. 19, 2009, 5 pages of Office Action and English translation of 5 pages.

"Workings of VT and operating conditions", Linux WORLD, IDG Japan, Inc., vol. 5, No. 4, Apr. 1, 2006, pp. 136-141.

Office Action received for Japanese Patent Application No. 2007-257926, mailed on May 17, 2011, 2 pages of Japanese Office Action and 2 pages of English Translation.

Arai, et al., "Proposal and Realization of Nanokernel Mutually Complementing General OS and Dedicated OS with High Efficiency," IPSJ Journal ; vol. 46(10), published Oct. 15, 2005, pp. 2492-2504 (english abstract included).

Japanese Notice of Reasons for Rejection dated Jan. 11, 2011 issued in related Japanese Patent Application No. 2007-257926.

* cited by examiner

SYSTEM AND METHOD FOR INCREASING PLATFORM BOOT EFFICIENCY

FIELD OF THE INVENTION

An embodiment of the present invention relates generally to computing platforms and, more specifically, to decreasing boot time by utilizing virtualization or partitioning techniques. In an embodiment, a hypervisor/platform partition will control the platform and allow for the initialization of a remaining main partition.

BACKGROUND INFORMATION

Various mechanisms exist for increasing platform boot efficiency, or decreasing boot time, have been implemented in existing systems.

Many vendors and users of platforms are concerned with the amount of time it takes to boot a platform. In this sense, booting comprises powering on the platform and proceeding to the point of getting a user login prompt or being able to run user applications. There are many standards associated with ensuring that platforms can run through the firmware path as quickly as possible. The time required to launch an operating system (OS) may vary based on the complexity of the OS. A typical desktop platform may take 7.5 seconds to boot to launch of the OS. The actual standards are driven by the industry as a whole. This is also evident in the server environment to accommodate highly available systems. The shorter the boot time, the more available the server will be after maintenance or crash. Faster boot times are extremely desirable in systems having a requirement to be highly available/reliable or in Internet cafés where systems are rebooted after each user's session.

BRIEF DESCRIPTION OF THE DRAWINGS

The features and advantages of the present invention will become apparent from the following detailed description of the present invention in which.

DETAILED DESCRIPTION

Figure 1:
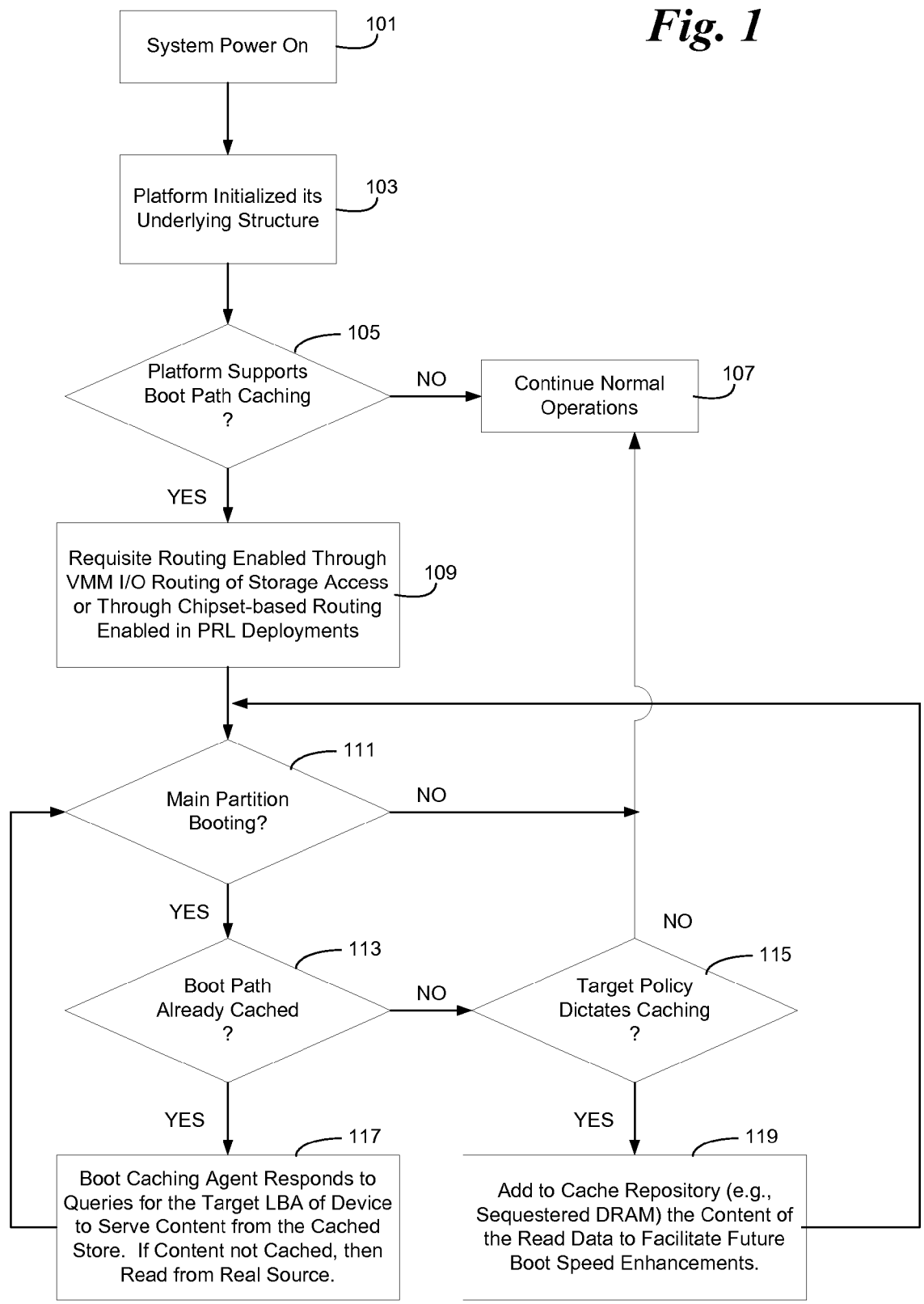
FIG. 1 is a flow diagram showing an exemplary method for boot caching, according to an embodiment of the invention.

An embodiment of the present invention is a system and method relating to speeding boot time using a boot caching agent. In at least one embodiment, the present invention is intended to cache selected boot target data in a fast memory, typically volatile system memory, and intercept requests to access the cached boot target data rather than read the data from a slower boot target memory, on a reboot or reset.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

In one embodiment, a virtual machine monitor (VMM) or hypervisor is used to effectuate a more efficient boot. A VMM may keep track of the system during boot. The VMM virtualizes access to hardware and provides abstractions for certain devices. Some devices may be made visible to the operating system (OS) while it is booting, while other devices are hidden from the OS during boot, by the VMM. In future systems, many platforms may be controlled or monitored by VMMs or platform resource layers (PRLs). VMMs are a software embodiment in use today.

In another embodiment, a platform resource layer (PRL) may be implemented as a chipset assisted topology that may be enabled in future silicon product releases, for instance, from Intel Corporation. These chipset features may support the ability to provide for hardware assisted, yet software programmable isolation, of various execution environments. This chipset provides measured solution which simulates many of the control points of traditional software VMMs, but is accomplished via hardware assistance in various components of the underlying platform hardware/chipset. This chipset assisted topology allows multiple partitions to be defined on a platform. An embedded, or system partition may control the boot process, as further described below.

In an embodiment, a boot caching agent, which may be part of the VMM, monitors what the platform is doing during boot. The agent is relatively static. In a traditional environment, one would pull the power plug and the entire system acquiesces and the boot starts over from the beginning. However, parts of the system remain fairly static and starting from scratch is often unnecessary. Pieces of the system may remain sentient, i.e., resident and operational, while the platform is booting. During this boot process, the hardware is initialized; the boot target is determined; boot code is loaded from target media and executed; etc. In all, hundreds of megabytes of data may be required to be read from the boot target media. The OS may be loaded from disk, as well as, required drivers.

In an embodiment, a caching agent monitors the boot process and may store information about portions of the boot process in system memory (RAM), including information retrieved from the boot target. Physical, or system volatile memory, is becoming less expensive as time goes on. Therefore, storing several hundred megabytes of data is not as costly as it once was. This memory is typically fast and highly accessible to processors on the platform. During the boot process, the OS loader retrieves a certain amount of data and instructions from the boot target, typically a hard drive. The boot caching agent monitors the retrieval of this data up to a predetermined point, and may copy or mirror the information in a portion of system memory. This method takes advantage of the fact that the likelihood is that when the system is booted again, this same information will be required, with little or no modification. In legacy firmware embodiments, the firmware loads the first sector of data (i.e., boot record) from the hard drive (boot target media), and then the boot record which was populated on the hard drive by the operating system acts as an OS loader. In an extensible firmware interface (EFI) compatible architecture embodiment, instead of the first sector being loaded, the OS application, often known as the OS loader, is launched, with similar effect. The OS loader proceeds to load the remaining data needed for booting from the boot target media. This remaining data is often unmodified from the previous boot.

According to embodiments of the invention, when the system is booted the next time, this loaded information is to reside in fast, accessible memory. Thus, the boot caching agent may provide this data to the OS or firmware and avoid having to access a slower media device, such as a hard drive. An advantage to using volatile system memory is that while the RAM is volatile, it is not typically initialized, zeroed out or made unreliable unless the power source is completely removed. Therefore, when a system is rebooted that has not had a full removal of its power source, data may be retrieved from the system memory during reboot.

A boot caching agent may have dedicated resources, for instance, a separate processor, memory, etc. When data are loaded and executed during boot, the boot caching agent may store and retrieve boot data from dedicated resources that are not available to the main OS. During reboot, the OS dedicated memory is initialized as usual, but this does not interfere with memory dedicated to the boot caching agent.

Referring to FIG. 1, there is shown an exemplary method for a boot caching agent, according to embodiments of the invention. The system is powered on, or a reset request is made in block 101. The underlying structure of platform is initialized, if necessary, for instance, when booting for the first time, in block 103. A determination is made as to whether the platform supports boot path caching in block 105. If not, the platform continues to boot from the boot target media in block 107.

If the platform supports boot path caching, then the requisite routing of data is enabled, in block 109. In the case of a platform with a VMM, hypervisor, or other privileged layer, the VMM virtualizes I/O access and enables the boot caching agent to control data retrieval from the boot media. The boot caching agent is enabled to mirror the sector data in a volatile store and index the sectors retrieved, for later use. In the case of a platform with chipset partitioning support, the boot caching agent residing in the embedded platform controls device access automatically, and is enabled to mirror the boot data in partitioned memory, for later use.

If the main partition is booting, as determined in block 111, then a determination is made as to whether the boot path has been previously cached, in block 113. If so, then the boot caching agent intercepts the requests to read boot data from the boot target. If a requested sector is located in the boot caching agent index, then the sector is retrieved from the volatile store instead of the boot target media. The method used for interception depends on platform architecture, i.e., VMM or chipset partitioning (PRL).

If it was determined that it was not the main partition (or other guest OS) booting, then normal operations, i.e., normal boot, may be resumed in block 107.

If the boot path has not previously been cached, as determined in block 113, then a target policy may be consulted to determine whether the boot data should be cached. For instance, in some cases, a platform may be enabled to boot both Microsoft® Windows™ and Linux®. There may be limited memory available for caching boot target data and a user may choose to only cache data for one operating system or the other. Boot data may then be cached based on which boot target has been selected for reset/boot. In other cases, a frequency of use for the boot target may be saved and only the most frequently used boot target is to be cached. In other cases, the boot target, or a portion thereof, will always be cached. It will be understood by one of ordinary skill in the art that various policies may be tailored for platforms having different functions.

If target policy dictates that the target is enabled for caching, as determined in block 115, then the sectors retrieved from the boot target are mirrored in a volatile or faster store, in block 119. While embodiments of the present invention describe caching the data in volatile memory, it is contemplated that any memory may be used for caching that is faster than the boot target and still reap the benefits of the disclosed method. When a reset or reboot alert is received, processing continues again at block 111 to determine whether the main partition should be rebooted and whether data may be retrieved from a fast store, as opposed to the boot target media.

If target policy dictates that the boot data should not be cached, then operations continue with a normal boot, in block 107.

In an embodiment running a VMM, the VMM acts as an intermediary to reset requests. The VMM intercepts the reset request and resets only the portion of memory and resources used by the virtual machine running the OS making the request. Other components of the platform may not be reset. In an embodiment running with a PRL enabled chipset, the chipset may act as the intermediary and intercept the reset request.

Figure 2:
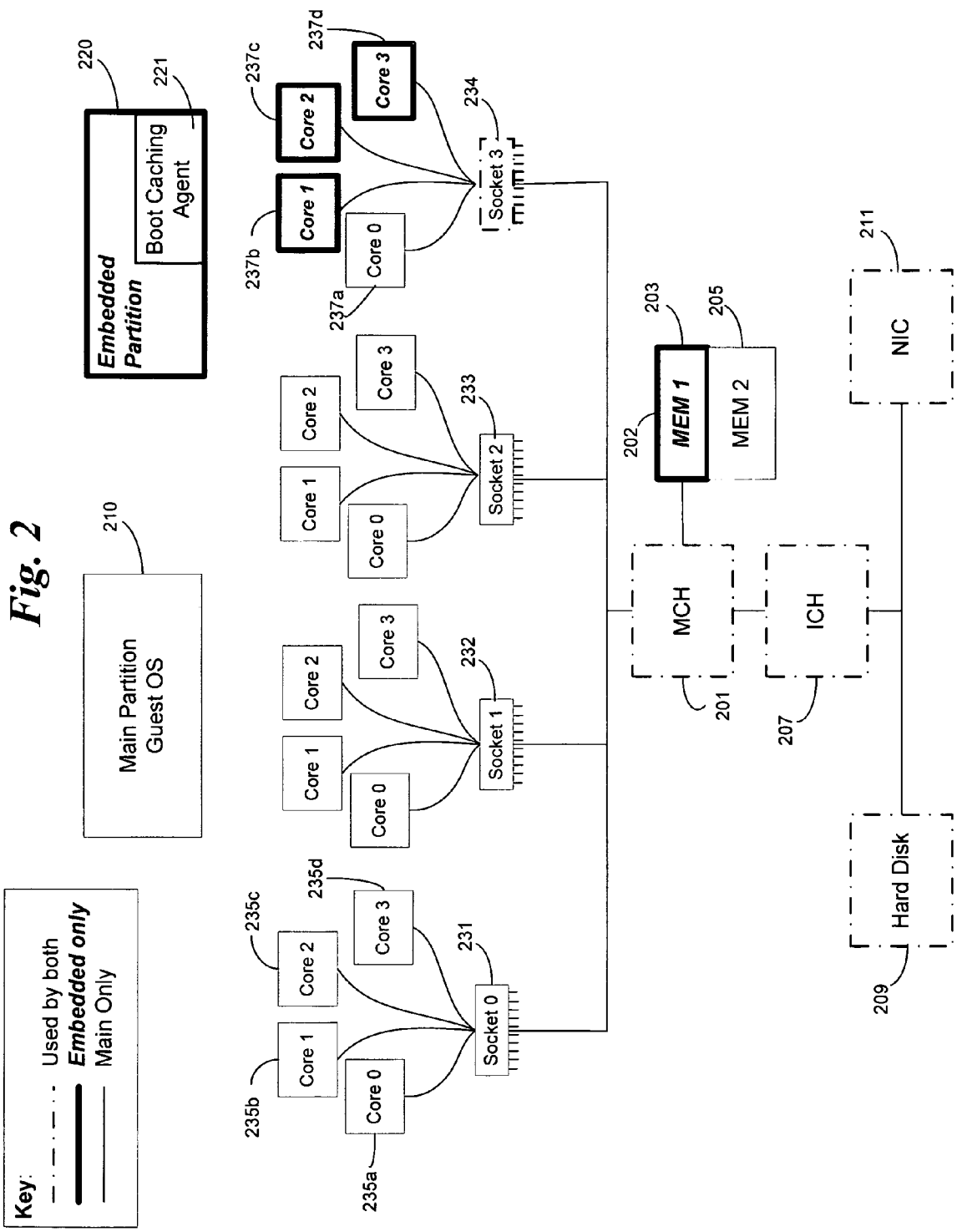
FIG. 2 is a block diagram showing a boot caching agent residing in an embedded partition on a platform with multiple partitions, according to an embodiment of the invention.

In a platform resource layer (PRL) architecture, or embedded partition architecture, various components of the platform are enhanced to enable partitioning of processor, memory and other resources. Referring now to FIG. 2, there is shown an exemplary block diagram of a PRL architecture, according to embodiments of the invention. To better illustrate partitioning, components that are available to the main partition 210 are drawn with solid blocks. Components available to the embedded, or system partition 220, are drawn with bold, solid blocks. Components available to both partitions are drawn with a block alternating with dots and dashes.

In this exemplary embodiment, a platform has four multi-core processors in Sockets 0-3 (231-234). While this example shows only four processor sockets, it will be apparent to one of ordinary skill in the art that various configurations of processors and cores may be used to practice embodiments of the invention. For instance, Socket 0 (231) may have four processing cores 235a-d. In essence, in this example, the illustrated embodiment has 16 effective processors on the platform (e.g., four sockets with four cores in each socket). In this example, Sockets 0-2 (231-233) are available only to the main partition 210. Socket 3 (234) is available to both the main partition 210 and to the embedded partition 220. Within Socket 3 (234), core 0 is available only to the main partition 210, and cores 1-3 are available only to the embedded partition 220. The embedded partition 220 has the boot caching agent 221, as more fully discussed above and below.

In this embodiment, the platform has a memory controller hub (MCH) 201 (also known as north bridge) coupled to memory 202. Memory 202 may have two partitions MEM1 (203) and MEM2 (205). Memory partition MEM1 (203) is available only to the embedded partition and memory partition MEM2 (205) is available only to the main partition. The chipset containing the MCH is configured to partition the memory using hardware constructs, in contrast to a VMM solution which uses software constructs. It will be understood that memory 202 may be a hard disk, a floppy disk, random access memory (RAM), read only memory (ROM), flash memory, or any other type of medium readable by processor. Memory 202 may store instructions for performing the execution of embodiments of the present invention. While only two partitions are shown in this example, it will be understood that there may be more than one guest OS, each running in its own partition.

The MCH 201 may communicate with an I/O controller hub (ICH) 207, also known as South bridge, via a peripheral component interconnect (PCI) bus. The ICH 207 may be coupled to one or more components such as PCI hard drives, legacy components such as IDE, USB, LAN and Audio, and a Super I/O (SIO) controller via a low pin count (LPC) bus (not shown). In this example, the ICH 207 is shown coupled to a hard disk drive 209 and to a network interface controller (NIC) 211.

The MCH 201 is configured to control accesses to memory and the ICH 207 is configured to control I/O accesses. In an embedded partition architecture, the chipset is configured by the firmware, upon boot, to partition the various resources on the platform. In some cases, there may be only one partition and the platform acts like a legacy platform in most respects. In the example shown, there are two partitions, a main partition 210 and an embedded partition 220. Each partition designated is given a unique partition identifier (ID).

With an embedded partition configuration, when a device sends an alert, the chipset may properly route the alert to the appropriate partition, as this information is encoded at boot time. In a VMM enabled system, the hardware passes the device alerts to the VMM (virtualized devices) and the software routes the information appropriately to the various virtual machines. An embedded partition may act as hardware assisted virtualization.

In an embodiment, a boot caching agent is embodied within a VMM which controls all guest virtual machines (VMs) and guest operating systems (OS's) running on the platform. In another embodiment, the boot caching agent is embodied in a privileged partition, process or hypervisor that controls I/O requests for individual OS's. In all cases, the boot caching agent selectively mirrors data retrieved from boot or other target media during an initial boot and returns this data upon subsequent boots to avoid reading from slower media. In the case of a VMM architecture, device access is virtualized and the boot caching agent acts as a software intermediary to retrieve data from the device.

Figure 3:
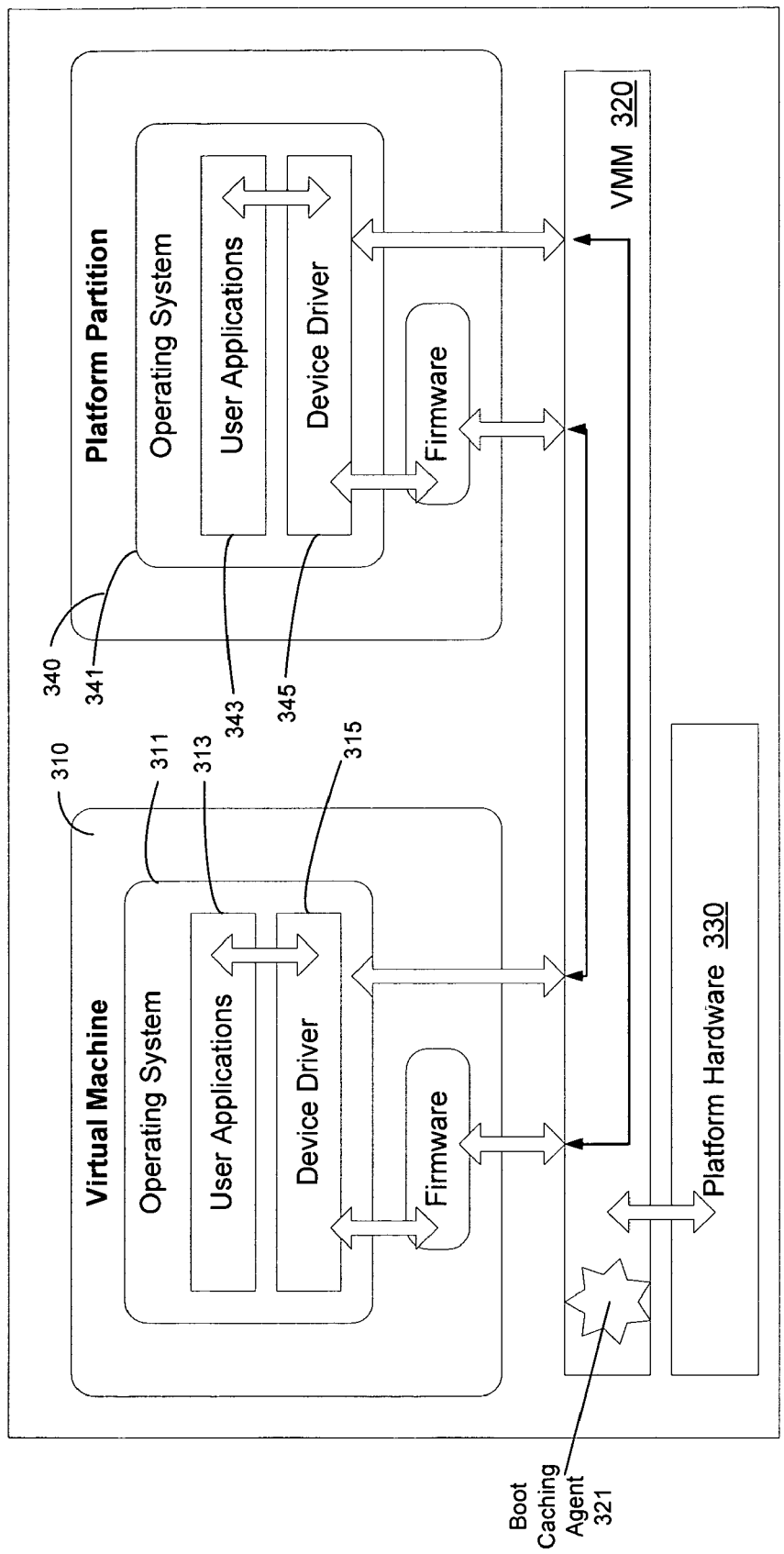
FIG. 3 is a block diagram of an exemplary platform where the boot caching agent resides in a virtual machine monitor (VMM), according to an embodiment of the invention.

Referring now to FIG. 3, an exemplary virtualization platform where the boot caching agent 321 resides in a VMM is shown. In this exemplary embodiment, a virtual machine (VM) 310 has a guest OS 311. Various user applications 313 may run under the guest OS 311. The OS has device drivers 315 which may be virtualized within the VMM 320. Access to platform hardware 330, including a boot target (not shown) will require the use of the VMM. In the case of booting, a boot caching agent 321 within the VMM 320 may intercept device access to the boot target and control whether sectors are read from the slower boot target or faster volatile memory.

Similarly, a platform partition, or more privileged partition 340 having its own OS 341, user applications 343, device drivers 345 is shown. This platform partition may also have virtualized devices via the VMM 320. In some cases, the boot caching agent will cache boot target data for this partition, as well.

In an embodiment, the boot caching agent caches information based on sectors, or logical block addresses, requested during boot. During the boot process, specific sectors are read from the boot media and these sectors are mirrored by the cache boot agent to partitioned or dedicated volatile memory. In an embodiment, the boot caching agent stores an index of the stored sectors in a buffer, along with the actual sector data. During a subsequent reboot, the boot caching agent intercepts requests to read from the boot media. If a sector is requested that has been previously mirrored to the volatile store, the boot caching agent returns this data at a significant time savings compared to reading the data from a non-volatile memory store (boot media).

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system for speeding boot time, comprising:
   a platform having at least one processor coupled with memory;
   a boot caching agent running on the at least one processor in a first execution partition, the execution partition to control access to a boot target medium; and
   an operating system running in a second execution partition, wherein the second execution partition has access to the boot target medium via the first execution partition,
   wherein, at boot time, the boot caching agent is to selectively store boot target data for a boot target to a memory having faster access than the boot target medium if a target policy dictates that the boot target is enabled for caching, and wherein the boot caching agent is to selectively retrieve the stored boot target data from the faster memory upon a reset or reboot of the operating system in the second execution partition if the boot target is enabled for caching.

2. The system as recited in claim 1, wherein the faster memory is volatile system memory, and wherein an operating system outside of the first execution partition has no access to the stored boot target data in the faster memory.

3. The system as recited in claim 1, wherein the platform is enabled for chipset partitioning, and wherein the boot caching agent resides in an embedded execution partition.

4. The system as recited in claim 3, wherein the chipset is to enable a resource to be dedicated to a selected execution partition, wherein partitioning is defined by platform firmware upon booting.

5. The system as recited in claim 3, wherein the embedded execution partition is a privileged partition to automatically intercept device access to the boot target medium.

6. The system as recited in claim 3, wherein the boot caching agent is to store an index of sectors retrieved from the boot target medium to identify stored sectors of data.

7. The system as recited in claim 4, wherein the boot caching agent is to determine whether a requested sector has been stored and if not, retrieves the requested sector from the boot target medium, otherwise, the boot caching agent to retrieve the requested sector from the stored memory.

8. The system as recited in claim 1, wherein the faster memory is non-volatile memory, and wherein an operating system outside of the first execution partition has no access to the stored boot target data in the faster memory.

9. The system as recited in claim 1, wherein the platform is enabled for virtualization, and wherein the boot caching agent resides in a virtual machine monitor (VMM).

10. The system as recited in claim 9, wherein the VMM virtualizes device access to the boot target medium.

11. The system as recited in claim 10, wherein the boot caching agent is to store an index of sectors retrieved from the boot target medium to identify stored sectors of data.

12. The system as recited in claim 9, wherein the boot caching agent is to determine whether a requested sector has been stored and if not, retrieves the requested sector from the boot target medium, otherwise, the boot caching agent to retrieve the requested sector from the stored memory.

13. The system as recited in claim 1, wherein the boot caching agent is to selectively store sectors from the boot target medium based on a target policy.

14. A method for speeding boot time, comprising:
    selectively storing boot target data for a boot target retrieved at boot time by a boot caching agent if a target policy dictates that the boot target is enabled for caching, the boot target data retrieved from a boot target medium, wherein the boot target data is stored in a memory faster than the boot target medium; and
    upon a reboot of an operating system, selectively retrieving the boot target data from the stored boot target data in the faster memory if the boot target is enabled for caching, the retrieving controlled by the boot caching agent, wherein the boot caching agent resides in a first platform partition and the operating system resides in a second platform partition.

15. The method as recited in claim 14, wherein the first platform partition is a virtual machine monitor, and the second partition is a virtual machine.

16. The method as recited in claim 14, wherein the first platform partition is an embedded partition of a platform enabled with chipset partitioning.

17. The method as recited in claim 14, wherein the faster memory is volatile system memory, and wherein the second partition has no access to the stored boot target data.

18. The method as recited in claim 14, further comprising:
    storing an index of sectors retrieved from the boot target medium to identify stored sectors of data, by the boot caching agent.

19. The method as recited in claim 14, wherein the retrieving the boot target data further comprises:
    determining whether a requested sector has been stored and if not, retrieving the requested sector from the boot target medium, otherwise, the retrieving the requested sector from the stored memory.

20. The method as recited in claim 14 wherein selectively storing boot target data further comprises:
    selectively storing sectors from the boot target medium based on a target policy.

21. A memory having instructions stored therein that when executed by a machine, cause the machine to:
    selectively store boot target data for a boot target retrieved at boot time by a boot caching agent if a target policy dictates that the boot target is enabled for caching, the boot target data retrieved from a boot target medium, wherein the boot target data is stored in a memory faster than the boot target medium; and upon a reboot of an operating system, selectively retrieve the boot target data from the stored boot target data in the faster memory if the boot target is enabled for caching, the retrieving controlled by the boot caching agent, wherein the boot caching agent resides in a first platform partition and the operating system resides in a second platform partition.

22. The memory as recited in claim 21, wherein the first platform partition is a virtual machine monitor, and the second partition is a virtual machine.

23. The memory as recited in claim 21, wherein the first platform partition is an embedded partition of a platform enabled with chipset partitioning.

24. The memory as recited in claim 21, wherein the faster memory is volatile system memory, and wherein the second partition has no access to the stored boot target data.

25. The memory as recited in claim 21, further comprising instructions that when executed by the machine, cause the machine to:

store an index of sectors retrieved from the boot target medium to identify stored sectors of data, by the boot caching agent.

26. The memory as recited in claim 21, wherein the retrieving the boot target data further comprises instructions that when executed, cause the machine to:

determine whether a requested sector has been stored and if not, retrieve the requested sector from the boot target medium, otherwise, the retrieve the requested sector from the stored memory.

27. The memory as recited in claim 21 wherein selectively storing boot target data further comprise instructions that when executed cause the machine to:

selectively store sectors from the boot target medium based on a target policy.

\* \* \* \* \*